(12) United States Patent
Miyawaki et al.

(10) Patent No.: US 8,287,692 B2
(45) Date of Patent: Oct. 16, 2012

(54) PROCESSES FOR PRODUCING CELLULOSE NANOFIBERS

(75) Inventors: Shoichi Miyawaki, Tokyo (JP); Shiho Katsukawa, Tokyo (JP); Hiroshi Abe, Tokyo (JP); Yuko Iijima, Tokyo (JP); Akira Isogai, Tokyo (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 99 days.

(21) Appl. No.: 12/811,046

(22) PCT Filed: Dec. 25, 2008

(86) PCT No.: PCT/JP2008/073542
§ 371 (c)(1),
(2), (4) Date: Jun. 28, 2010

(87) PCT Pub. No.: WO2009/084566
PCT Pub. Date: Jul. 9, 2009

(65) Prior Publication Data
US 2010/0282422 A1      Nov. 11, 2010

(30) Foreign Application Priority Data

Dec. 28, 2007 (JP) ................................ 2007-340371
Dec. 28, 2007 (JP) ................................ 2007-340441

(51) Int. Cl.
D21H 13/02 (2006.01)
C08B 1/00 (2006.01)
C08B 15/04 (2006.01)
B82B 3/00 (2006.01)

(52) U.S. Cl. ................. 162/9; 162/56; 162/72; 162/81; 162/157.6; 8/116.1; 536/56; 241/2; 977/706

(58) Field of Classification Search ............... 162/9, 70, 162/72, 81, 157.6–157.7, 164.6, 168.2, 182, 162/56; 8/116.1, 116.4, 181, 185; 536/56; 977/706, 718; 241/2, 21
See application file for complete search history.

(56) References Cited

U.S. PATENT DOCUMENTS

| | | | |
|---|---|---|---|
| 6,524,348 B1* | 2/2003 | Jewell et al. ................... 8/116.1 |
| 6,770,755 B1 | 8/2004 | Gunnars et al. |
| 7,001,483 B2* | 2/2006 | Severeid et al. .................. 162/9 |
| 7,247,722 B2* | 7/2007 | Cimedoglu et al. ............. 536/56 |
| 2002/0072598 A1* | 6/2002 | Besemer et al. ................ 536/56 |
| 2002/0098317 A1* | 7/2002 | Jaschinski et al. .............. 428/72 |
| 2003/0024661 A1 | 2/2003 | Shore et al. |
| 2003/0029588 A1* | 2/2003 | Cui et al. ........................ 162/72 |
| 2003/0209336 A1* | 11/2003 | Cimecioglu et al. ............. 162/81 |
| 2005/0028952 A1* | 2/2005 | Severeid et al. ................. 162/57 |
| 2005/0028953 A1* | 2/2005 | Severeid et al. ................. 162/57 |
| 2005/0121159 A1* | 6/2005 | Jetten et al. ...................... 162/81 |
| 2006/0183821 A1* | 8/2006 | Kaspers et al. .................. 524/13 |
| 2007/0232838 A1 | 10/2007 | Iwabuchi et al. |
| 2008/0105393 A1* | 5/2008 | Besemer et al. ................ 162/70 |
| 2010/0233481 A1* | 9/2010 | Isogai et al. .................... 428/401 |
| 2010/0282422 A1* | 11/2010 | Miyawaki et al. ............... 162/76 |
| 2011/0008638 A1* | 1/2011 | Miyawaki et al. .......... 428/537.5 |
| 2011/0088860 A1* | 4/2011 | Heijnesson-Hulten et al. ........................... 162/164.1 |
| 2012/0009661 A1* | 1/2012 | Miyawaki et al. ............. 435/277 |
| 2012/0053348 A1* | 3/2012 | Kozawa et al. .................. 546/94 |
| 2012/0065219 A1* | 3/2012 | Ji et al. .......................... 514/278 |
| 2012/0065389 A1* | 3/2012 | Miyawaki et al. .............. 536/57 |
| 2012/0130064 A1* | 5/2012 | Isogai et al. .................... 536/56 |

FOREIGN PATENT DOCUMENTS

| | | | |
|---|---|---|---|
| EP | 2216345 A1 * | 8/2010 |
| JP | 2003-26701 | 1/2003 |
| JP | 2003-516939 | 5/2003 |
| JP | 2008-1728 | 1/2008 |
| JP | 2008-308802 | 12/2008 |
| JP | 2009161613 A * | 7/2009 |
| JP | 2009243014 A * | 10/2009 |
| JP | 2010180309 A * | 8/2010 |
| JP | 2010209510 A * | 9/2010 |
| JP | 2010235669 A * | 10/2010 |
| JP | 2010235679 A * | 10/2010 |
| JP | 2010235681 A * | 10/2010 |
| JP | 2011074528 A * | 4/2011 |
| WO | WO 9905108 A1 * | 2/1999 |
| WO | WO 0100681 A1 * | 1/2001 |
| WO | WO 2006/001387 | 1/2006 |
| WO | WO 2009084566 A1 * | 7/2009 |
| WO | WO 2010116794 A1 * | 10/2010 |
| WO | WO 2010116826 A1 * | 10/2010 |

OTHER PUBLICATIONS

International Search Report for PCT/JP2008/073542, mailed Apr. 7, 2009.
Saito, T. et al., "Preparation of Cellulose Single Microfibrils from Native Celluloses by TEMPO-Mediated Oxidation", Cellulose Commun., vol. 14, No. 2, (Jun. 2007), pp. 62-66.
Shibata, I. et al., "Nitroxide-mediated oxidation of cellulose using TEMPO derivatives: HPSEC and NMR analyses of the oxidized products", Cellulose, vol. 10, No. 4, (Dec. 2003), pp. 335-341.
Extended European Search Report in EP 08 867 327.2 mailed Mar. 22, 2011.
Saito et al, "Cellulose Commun.", vol. 14, No. 2, Jul. 20, 2011, p. 62.
Shibuya et al, "J. Am. Chem. Soc.", vol. 128, Jun. 20, 2001, p. 8412.

* cited by examiner

*Primary Examiner* — Jose A Fortuna
(74) *Attorney, Agent, or Firm* — Nixon & Vanderhye P.C.

(57) ABSTRACT

Cellulose nanofibers are produced using a 4-hydroxy TEMPO derivative by treating a cellulosic material with an oxidizing agent in water in the presence of a cellulose oxidation catalyst containing an N-oxyl compound to prepare oxidized cellulos, and microfibrillating the oxidized cellulose.

3 Claims, 1 Drawing Sheet

PROCESSES FOR PRODUCING CELLULOSE NANOFIBERS

This application is the U.S. national phase of International Application No. PCT/JP2008/073542 filed 25 Dec. 2008, which designated the U.S. and claims priority to Japan Application No. 2007-340371 filed 28 Dec. 2007; and Japan Application No. 2007-340441 filed 28 Dec. 2007, the entire contents of each of which are hereby incorporated by reference.

TECHNICAL FIELD

A first embodiment included in the present invention relates to a process by which cellulose nanofibers can be prepared less expensively than conventionally by using a specific N-oxyl compound as a cellulose oxidation catalyst.

A second embodiment included in the present invention relates to a method for converting a cellulosic material into nanofibers more rapidly than conventional methods by using an aza-adamantane nitroxyl radical as a cellulose oxidation catalyst in place of the radical 2,2,6,6-tetramethyl-1-piperidine-N-oxy and a method for efficiently converting a cellulosic material into nanofibers even though it was difficult to convert into nanofibers by conventional methods.

BACKGROUND ART

It has been known that carboxyl groups can be efficiently introduced onto cellulose microfibril surfaces and a homogeneous and clear aqueous cellulose nanofiber solution can be prepared with little energy consumption for microfibrillation by treating a cellulosic material with an inexpensive oxidizing agent sodium hypochlorite in the presence of the radical 2,2,6,6-tetramethyl-1-piperidine-N-oxy (hereinafter referred to as TEMPO) and a bromide or iodide as catalysts (non-patent document 1: Saito, T., et al., Cellulose Commun., 14 (2), 62 (2007)).

This technique for producing cellulose nanofibers is environmentally advantageous as a reaction process in that it uses water as a solvent, the reaction by-product is only sodium chloride, etc., but it should be still improved in the production cost because TEMPO is very expensive. It should also be improved in productivity because the consistency of the cellulosic material during the treatment is as low as about 1% by weight and the treatment period is long (about 1-2 hours).

A TEMPO derivative, 4-hydroxy TEMPO is produced in Japan in a yield of hundreds of tons a year and mainly used as polymerization inhibitors and stain repellents in the field of petrochemical industries because it can be synthesized more easily than TEMPO, it has already been included in safety data sheets under European regulations on chemical substances so that it can be smoothly exported or internally distributed, and it is more biodegradable than TEMPO. Thus, 4-hydroxy TEMPO is much less expensively available than TEMPO. However, it was difficult to convert wood cellulose into nanofibers with 4-hydroxy TEMPO because it could not efficiently introduce carboxyl groups onto microfibril surfaces of wood cellulose.

A possible approach for improving the productivity of cellulose nanofibers is to increase the consistency of the cellulosic material, but a high stirring force is required to homogeneously oxidize high-consistency slurry. However, the application of a strong shearing force during the reaction partially converts cellulose into nanofibers, which cannot be recovered during dehydration/washing steps after the completion of the reaction, resulting in a great loss of the yield. Consequently, a method capable of increasing the reaction speed to shorten the treatment period had to be developed to improve productivity. Moreover, linear polymeric cellulose molecular chains forming nanofibers are partially oxidized and tend to be bent during the TEMPO-catalyzed oxidation treatment as the reaction period increases. As a result, the nanofibers lose their characteristic stiffness and fail to retain their straight fiber shape, thus inviting deterioration in quality such as film strength and barrier properties. For this reason, it would be desirable to shorten the reaction period from the aspect of not only productivity but also quality improvement of cellulose nanofibers. In addition, it was difficult to prepare a homogeneous and clear cellulose nanofiber solution by the conventional TEMPO-catalyzed oxidation treatment from highly crystalline powdery cellulose materials deprived of noncrystalline regions by acid hydrolysis, and a nitroxyl radical having a novel structure ensuring better oxidation performance than TEMPO had to be discovered to convert such highly crystalline cellulosic materials into nanofibers.

Non-patent document 1: Saito, T., et al., Cellulose Commun., 14 (2), 62 (2007).

DISCLOSURE OF THE INVENTION

Problems to be Solved by the Invention

The first embodiment of the present invention aims to provide a process for producing cellulose nanofibers by using a 4-hydroxy TEMPO derivative that is less expensive than TEMPO.

The second embodiment of the present invention aims to provide a process by which homogeneous cellulose nanofibers can be rapidly prepared by using a catalyst having better oxidation performance than TEMPO.

Means for Solving the Problems

As a result of careful studies to overcome these problems of conventional techniques, we accomplished the present invention on the basis of the finding that wood cellulose can be efficiently converted into nanofibers by using a process for producing cellulose nanofibers comprising treating a cellulosic material with an oxidizing agent in water in the presence of a cellulose oxidation catalyst comprising an N-oxyl compound represented by formula 1 below:

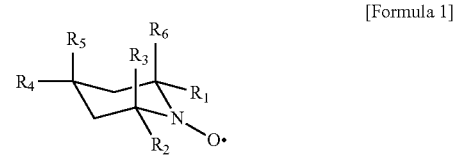

[Formula 1]

wherein $R_1$ and $R_2$ are each independently hydrogen or a $C_1$-$C_6$ straight or branched alkyl group; and (i) one of $R_4$ or $R_5$ is —OR, —OCOR or —OSO$_2$R wherein R is a straight or branched carbon chain having 4 or less carbon atoms, and the other of $R_4$ or $R_5$ is hydrogen, and $R_3$ and $R_6$ are methyl, or (ii) $R_4$ is hydrogen, and $R_5$, $R_3$ and $R_6$ are taken together with a piperidine ring to form an aza-adamantane compound having formula 2 below:

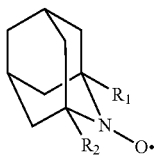

[Formula 2]

or a mixture thereof, and a compound selected from the group consisting of bromides, iodides and mixtures thereof to prepare oxidized cellulose, and microfibrillating the oxidized cellulose to convert it into nanofibers.

More specifically, we accomplished the first embodiment of the present invention on the basis of the finding that wood cellulose can be efficiently converted into nanofibers by using an N-oxyl compound represented by any one of formulae 1-3 below:

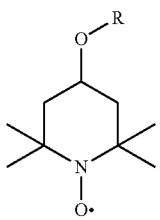

[Formula 3]

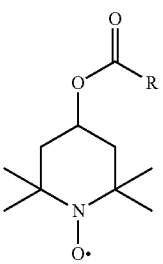

[Formula 4]

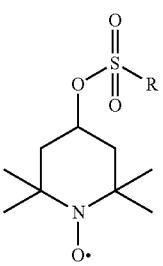

[Formula 5]

wherein R is a straight or branched carbon chain having 4 or less carbon atoms, i.e. a 4-hydroxy TEMPO derivative hydrophobicized by etherifying the hydroxyl group of 4-hydroxy TEMPO with an alcohol having a straight or branched carbon chain having 4 or less carbon atoms or esterifying it with a carboxylic acid or a sulfonic acid, and a compound selected from the group consisting of bromides, iodides and mixtures thereof as catalysts.

Also more specifically, as a result of careful studies to overcome problems of conventional techniques, e.g., to shorten the reaction period or to prepare a homogeneous and clear cellulose nanofiber solution, we accomplished the second embodiment of the present invention on the basis of the finding that cellulose nanofibers can be efficiently prepared by oxidizing a cellulosic material in the presence of an aza-adamantane nitroxyl radical represented by the chemical formula 6 below:

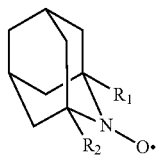

[Formula 6]

wherein $R_1$ and $R_2$ represent hydrogen or a $C_1$-$C_6$ straight or branched alkyl group, and a compound selected from the group consisting of bromides, iodides and mixtures thereof as catalysts.

Our research on literature about alcohol oxidation reactions catalyzed by aza-adamantane nitroxyl radicals revealed that a group evaluated the performance for converting the primary hydroxyl group of a low-molecular organic compound into an aldehyde in a two-phase solvent system consisting of dichloromethane-aqueous sodium hydrogen carbonate (Shibuya, M., et al., J. Am. Chem. Soc., 128, 8412 (2006)), but the oxidation catalyst used for converting cellulose into nanofibers was limited to an N-oxyl compound having a 5-membered ring or a 6-membered ring, and there was no reference to nanofibrillation catalyzed by an aza-adamantane nitroxyl radical.

Under these circumstances, we studied about whether or not primary hydroxyl groups on cellulose microfibril surfaces can be selectively and efficiently oxidized into carboxyl groups by applying aza-adamantane nitroxyl radicals to aqueous oxidation reactions of polymer compounds such as wood cellulose, and as a result, we found that nanofibers can be obtained much more rapidly than using TEMPO.

Advantages of the Invention

By using a 4-hydroxy TEMPO derivative as a catalyst in the first embodiment of the present invention, homogeneous and high-quality cellulose nanofibers can be prepared from cellulosic materials less expensively than using conventional TEMPO.

By using an aza-adamantane nitroxyl radical as a catalyst in the second embodiment of the present invention, homogeneous and high-quality cellulose nanofibers can be prepared from wood cellulose more rapidly than conventionally.

THE MOST PREFERRED EMBODIMENTS OF THE INVENTION

Figure 1:
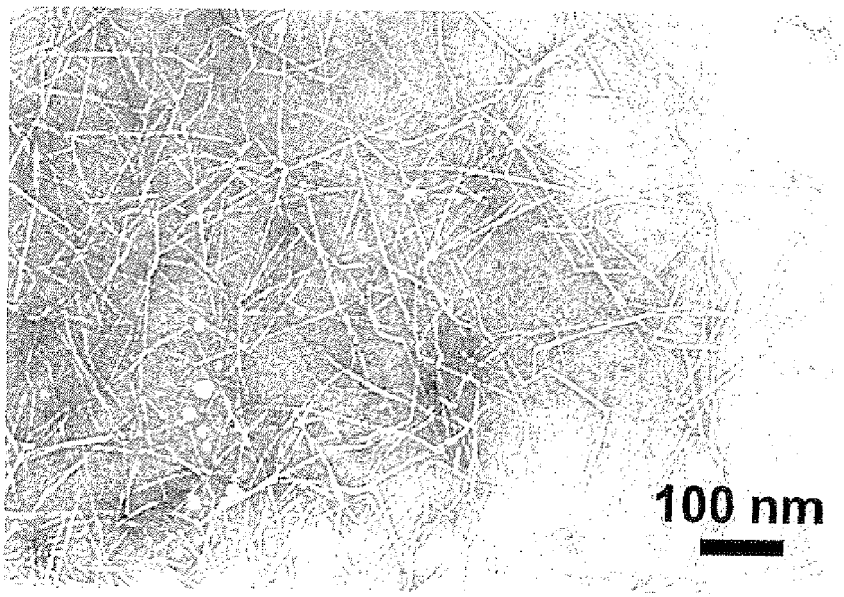
FIG. 1 shows a transmission electron micrograph in the aqueous cellulose nanofiber solution of Example 1.
Figure 2:
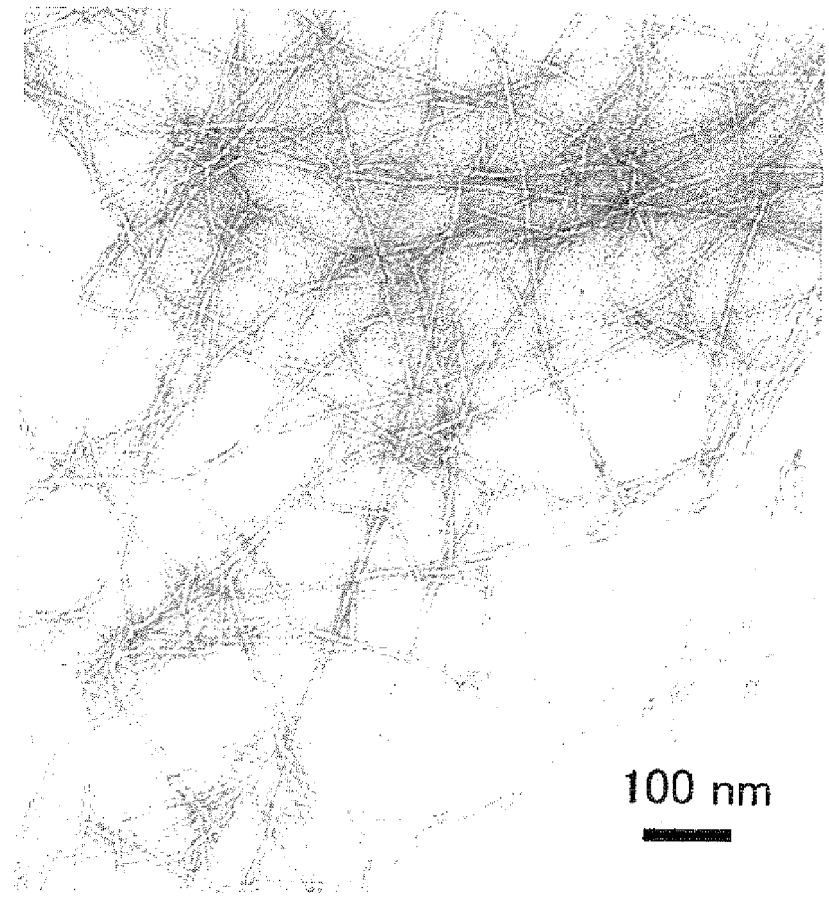
FIG. 2 shows a transmission electron micrograph in the aqueous cellulose nanofiber solution of Example 7.

The 4-hydroxy TEMPO derivative used in the first embodiment of the present invention may be any such derivative obtained by etherifying the hydroxyl group with an alcohol having a straight or branched carbon chain having 4 or less carbon atoms or esterifying it with a carboxylic acid or a sulfonic acid. If the carbon chain, saturated or unsaturated, contains 4 or less carbon atoms, the resulting derivative will be water-soluble and function as an oxidation catalyst. If the carbon chain contains 5 or more carbon atoms, however, the resulting derivative will be remarkably hydrophobic and water-insoluble and no more function as an oxidation catalyst.

Specific examples of aza-adamantane nitroxyl radicals used in the second embodiment of the present invention include 2-aza-adamantan-N-oxyl, 1-methyl-2-aza-adamantan-N-oxyl, 1,3-dimethyl-2-aza-adamantan-N-oxyl, etc.

The amount of the 4-hydroxy TEMPO derivative or aza-adamantane nitroxyl radical to be used is not specifically limited so far as it is a catalytic amount allowing cellulosic materials to be converted into nanofibers. For example, it is on the order of 0.01-10 mmol, preferably 0.01-1 mmol, more preferably 0.05-0.5 mmol per gram of a bone-dry cellulosic material.

The methods for oxidizing cellulosic materials according to the first and second embodiments of the present invention are characterized in that they are carried out in water by using an oxidizing agent in the presence of the 4-hydroxy TEMPO derivative or the aza-adamantane nitroxyl radical and a compound selected from the group consisting of bromides, iodides and mixtures thereof. The cellulosic materials oxidized by the oxidation methods of the present invention can be efficiently converted into nanofibers. The bromides or iodides that can be used include compounds capable of dissociating into ions in water, such as alkali metal bromides and alkali metal iodides. The amount of the bromides or iodides to be used can be selected in a range capable of promoting oxidation reaction. For example, it is on the order of 0.1-100 mmol, preferably 0.1-10 mmol, more preferably 0.5-5 mmol per gram of a bone-dry cellulosic material.

Any oxidizing agents capable of promoting an intended oxidation reaction can be used, such as halogens, hypohalogenous acids, halogenous acids and perhalogen acids or salts thereof, halogen oxides, peroxides, etc. From the aspect of the production cost of nanofibers, a preferred oxidizing agent to be used is sodium hypochlorite, which is most commonly used in current industrial processes and inexpensive and imposes a low burden on the environment. The amount of the oxidizing agents to be used can be selected in a range capable of promoting oxidation reaction. For example, it is on the order of 0.5-500 mmol, preferably 0.5-50 mmol, more preferably 2.5-25 mmol per gram of bone-dry bleached wood pulp in the case of the first embodiment of the present invention, and on the order of 0.5-500 mmol, preferably 0.5-50 mmol, more preferably 2.5-25 mmol per gram of a bone-dry cellulosic material in the case of the second embodiment of the present invention.

The cellulosic materials used in the first and second embodiments of the present invention are not specifically limited, and include kraft or sulfite pulp derived from various woods, or powdery cellulose obtained by pulverizing the pulp by a high-pressure homogenizer or mill or the like or microcrystalline cellulose powder purified by a chemical treatment such as acid hydrolysis.

The methods of the first and second embodiments of the present invention are characterized in that they allow oxidation reaction to smoothly proceed even under mild conditions. Thus, cellulosic materials can be efficiently oxidized even if the reaction temperature is room temperature on the order of 15-30° C. It should be noted that carboxyl groups are produced in cellulose and the pH of the reaction solution decreases as the reaction proceeds. Thus, the pH of the reaction solution is desirably maintained at about 9-12, preferably 10-11 so that the oxidation reaction can efficiently proceed.

The oxidized cellulose obtained by the first and second embodiments of the present invention can be microfibrillated by a simple method to give cellulose nanofibers. For example, an oxidized cellulosic material can be thoroughly washed with water and treated by using a known mixer/stirrer or emulsifier/disperser such as a high shear mixer or high-pressure homogenizer alone or in combination at appropriate to convert it into cellulose nanofibers. These apparatuses may be high-speed rotation type, colloid mill type, high pressure type, roll mill type, ultrasonic type, etc. At a shearing speed of 1000 $sec^{-1}$ or more, a homogeneous and clear cellulose nanofiber solution free from aggregate structure can be obtained.

The cellulose nanofibers prepared by the first and second embodiments of the present invention are cellulose single microfibrils on the order of 2-5 nm in width and 1-5 μm in length. The cellulose nanofibers exhibit excellent barrier properties, transparency and heat resistance so that they can be used for various applications such as wrapping materials. For example, a paper sheet obtained by coating or impregnating a base paper with the cellulose nanofibers can be used as a wrapping material having excellent barrier properties and heat resistance.

[Mechanisms]

The reason why the aza-adamantane nitroxyl radical used in the second embodiment of the present invention as a catalyst is advantageous for converting wood cellulose into nanofibers is supposed as follows. The aza-adamantane nitroxyl radical may efficiently oxidize highly sterically hindered alcohols resistant to oxidation because it can provide a reaction site larger by two methyls as compared with TEMPO ("New development of organic catalysts", p. 289, CMC Publishing Co., Ltd. (2006)).

Wood cellulose is formed from microfibrils each consisting of tens of cellulose molecules, and it is thought that crystalline regions having a degree of polymerization on the order of 200-300 and minor amounts of noncrystalline regions alternate in the microfibrils ("Material science of cellulose", p. 17, University of Tokyo Press (2001)). Glucopyranose units in the crystalline regions are firmly held together via hydrogen bonding so that the degree of freedom of the molecular motion is extremely limited. Glucopyranose units in the noncrystalline regions intervening between the crystalline regions are also prevented from free molecular motion. In such a fixed conformation, sterically hindered hydroxyl groups can be no more unhindered with the result that oxidation reaction proceeds very slowly when a nitroxyl radical having bulky methyl groups around the reaction active site such as TEMPO is used.

This may explain that oxidation reaction proceeds more readily in the presence of the aza-adamantane nitroxyl radical than TEMPO. The reason for this and the reason why the 4-hydroxy TEMPO derivative used in the first embodiment of the present invention is advantageous for converting wood cellulose into nanofibers are supposed as follows.

Wood cell walls consist of cellulose microfibrils, hemicellulose and lignin, with the spatial gap between the cellulose microfibrils being 4-5 Mil. Hemicellulose and lignin molecules are compactly packed within this gap (Dictionary of Cellulose edited by the Cellulose Society of Japan, p. 111, Asakura Publishing Co., Ltd. (2000)). Cellulose and hemicellulose molecular chains contain hydrophilic regions derived from C—OH groups and hydrophobic regions derived from C—H groups so that both hydrophilic regions and hydrophobic regions exist in the gap between microfibrils. It seems that the hydrophilic regions tend to interact with highly hydrophilic compounds having a hydrogen-bonding site while the hydrophobic regions tend to interact with hydrophobic compounds. In order to penetrate this gap to efficiently oxidize primary hydroxyl groups of cellulose on the microfibril surfaces, therefore, the TEMPO moiety structure in the first embodiment of the present invention and a partial structure in the second embodiment of the present invention must satisfy the following two requirements.

(1) They should have no hydrogen-bonding site capable of strongly interacting with hydrophilic regions so that they can freely move in the hydrophilic regions within microfibril gaps.
(2) They should have moderate hydrophobicity so that they can readily enter into the hydrophobic regions within microfibril gaps.

Even if 4-hydroxy or 4-oxo TEMPO could enter into microfibril gaps, it would be strongly attracted to hydrophilic regions having many hydrogen-bonding sites to prevent efficient catalytic oxidation because it has a hydroxyl group or carbonyl group capable of forming strong mutual hydrogen bonds at position 4 of the TEMPO structure. However, it is presumed that if an alkyl ether or acetoxy group is substituted for the 4-position hydroxyl group having a high hydrogen-bonding ability, oxidation reaction on the microfibril surfaces may smoothly proceed to give highly water-dispersible cellulose nanofibers because the hydrogen-bonding ability decreases and moderate hydrophobicity can be conferred. Another hydrophobicized candidate compound 4-oxo TEMPO obtained by oxidizing the hydroxyl group at position 4 of 4-hydroxy TEMPO was also tested, but found to be unsuitable for nanofibrillation in the same manner as 4-hydroxy TEMPO.

Oxidation of relatively sterically unhindered hydroxyl groups in the hydrophilic regions proceeds without difficulty whether the aza-adamantane nitroxyl radical or TEMPO is used because both catalysts have no hydrogen-bonding site in their molecular structure However, oxidation reaction in hydrophobic regions more advantageously proceeds in the presence of the aza-adamantane nitroxyl radical having higher hydrophobicity than TEMPO, which may promote oxidation reaction on the microfibril surfaces to stimulate nanofibrillation.

EXAMPLES

The following examples further illustrate the present invention, but the present invention should not be limited thereto. Examples 1-6 and Comparative examples 1-4 relate to the first embodiment of the present invention and comparative examples thereof, and Examples 7 and 8 and Comparative examples 5 and 6 relate to the second embodiment of the present invention and comparative examples thereof.

Example 1

To 500 ml of a solution of 94 mg (0.5 nmol) of 4-methoxy TEMPO (Sigma Aldrich) and 755 mg (5 mmol) of sodium bromide in water was added 5 g (dry bone) of softwood-derived bleached unbeaten sulfite pulp (NIPPON PAPER CHEMICALS CO., LTD.), and the mixture was stirred until the pulp was homogeneously dispersed. After adding 18 ml of an aqueous sodium hypochlorite solution (active chlorine 5%), the reaction system was adjusted to pH 10.3 with a 0.5 N aqueous hydrochloric acid solution and an oxidation reaction was started. As the pH in the system decreased during the reaction, a 0.5 N aqueous sodium hydrochloride solution was sequentially added to adjust the reaction system at pH 10. After the reaction was continued for 2 hours, the reaction mixture was filtered through a glass filter and thoroughly washed with water to give oxidized pulp. A 0.3% (w/v) slurry of the oxidized pulp was stirred at 12,000 rpm for 10 minutes to give a clear gel-like aqueous solution. This aqueous solution was observed by transmission electron microscopy to show that the pulp had been converted into nanofibers (FIG. 1). The 0.3% (w/v) aqueous cellulose nanofiber solution had a Brookfield viscosity (60 rpm, 20° C.) of 950 mPa·s.

Example 2

Oxidation reaction was performed in the same manner as in Example 1 but using 4-tert-butoxy TEMPO, and the pulp slurry was stirred at 12,000 rpm for 10 minutes to show that the pulp had been converted into nanofibers. The 0.3% (w/v) aqueous cellulose nanofiber solution had a Brookfield viscosity (60 rpm, 20° C.) of 930 mPa·s.

The 4-tert-butoxy TEMPO was obtained by reacting 4-hydroxy TEMPO and tert-butyl chloride in dichloromethane at 0-5° C.

Example 3

Oxidation reaction was performed in the same manner as in Example 1 but using 4-O-acetyl TEMPO, and the pulp slurry was stirred at 12,000 rpm for 10 minutes to show that the pulp had been converted into nanofibers. The 0.3% (w/v) aqueous cellulose nanofiber solution had a Brookfield viscosity (60 rpm, 20° C.) of 980 mPa·s.

The 4-O-acetyl TEMPO was obtained by reacting 4-hydroxy TEMPO and acetyl chloride in dichloromethane at 0-5° C.

Example 4

Oxidation reaction was performed in the same manner as in Example 1 but using 4-O-butylyl TEMPO, and the pulp slurry was stirred at 12,000 rpm for 10 minutes to show that the pulp had been converted into nanofibers. The 0.3% (w/v) aqueous cellulose nanofiber solution had a Brookfield viscosity (60 rpm, 20° C.) of 900 mPa·s.

The 4-O-butylyl TEMPO was obtained by reacting 4-hydroxy TEMPO and butylyl chloride in dichloromethane at 0-5° C.

Example 5

Oxidation reaction was performed in the same manner as in Example 1 but using 4-O-methanesulfonyl TEMPO, and the pulp slurry was stirred at 12,000 rpm for 10 minutes to show that the pulp had been converted into nanofibers. The 0.3% (w/v) aqueous cellulose nanofiber solution had a Brookfield viscosity (60 rpm, 20° C.) of 1050 mPa·s.

The 4-O-methanesulfonyl TEMPO was obtained by reacting 4-hydroxy TEMPO and methanesulfonyl chloride in dichloromethane at 0-5° C.

Example 6

Oxidation reaction was performed in the same manner as in Example 1 but using 4-O-butanesulfonyl TEMPO, and the pulp slurry was stirred at 12,000 rpm for 10 minutes to show that the pulp had been converted into nanofibers. The 0.3% (w/v) aqueous cellulose nanofiber solution had a Brookfield viscosity (60 rpm, 20° C.) of 1020 mPa·s.

The 4-O-butanesulfonyl TEMPO was obtained by reacting 4-hydroxy TEMPO and butanesulfonyl chloride in dichloromethane at 0-5° C.

Comparative Example 1

4-Pentoxy TEMPO did not dissolve in water and failed to catalyze nanofibrillation.

Comparative Example 2

4-O-2-Methylbutyryl TEMPO did not dissolve in water and failed to catalyze nanofibrillation.

Comparative Example 3

4-O-Pentanesulfonyl TEMPO did not dissolve in water and failed to catalyze nanofibrillation.

Comparative Example 4

4-O-Benzoyl TEMPO (Sigma Aldrich) did not dissolve in water and failed to catalyze nanofibrillation.

Example 7

Softwood-derived bleached unbeaten sulfite pulp (from NIPPON PAPER. CHEMICALS CO., LTD.) was used as a cellulosic material. To 500 ml of a solution of 83 mg (0.5 mmol) of 1-methyl-2-aza-adamantan-N-oxyl and 755 mg (5 mmol) of sodium bromide in water was added 5 g (dry bone) of the sulfite pulp, and the mixture was stirred until the pulp was homogeneously dispersed. After adding 18 ml of an aqueous sodium hypochlorite solution (active chlorine 5%), the reaction system was adjusted to pH 10.3 with a 0.5 N aqueous hydrochloric acid solution and an oxidation reaction was started. As the pH in the system decreased during the reaction, a 0.5 N aqueous sodium hydrochloride solution was sequentially added to adjust the reaction system at pH 10, and the reaction was continued for 20 minutes. After completion of the reaction, the pulp was filtered off through a glass filter and thoroughly washed with water to give oxidized pulp. A 0.3% (w/v) slurry of the oxidized pulp was stirred at 12,000 rpm for 10 minutes to prepare an aqueous cellulose nanofiber solution.

Example 8

Oxidized pulp was obtained in the same manner as in Example 7 except that microcrystalline cellulose powder (from NIPPON PAPER CHEMICALS CO., LTD.) was used as a cellulosic material. An aqueous cellulose nanofiber solution was prepared in the same manner as in Example 7 except that the consistency of the oxidized pulp was 0.9% (w/v).

Comparative Example 5

Oxidation reaction was performed in the same manner as in Example 7 except that TEMPO was used as a catalyst and the oxidation reaction period was 120 minutes, and the pulp slurry was stirred at 12,000 rpm for 10 minutes to prepare an aqueous cellulose nanofiber solution.

Comparative Example 6

Oxidation reaction was performed in the same manner as in Example 8 except that TEMPO was used as a catalyst and the oxidation reaction period was 120 minutes, and the pulp slurry was stirred at 12,000 rpm for 10 minutes to prepare an aqueous cellulose nanofiber solution.

The aqueous cellulose nanofiber solutions obtained in Examples 1-8 and Comparative examples 5 and 6 were tested for Brookfield viscosity (20° C., 60 rpm) and oxygen barrier properties. A film having a coating of 100 nm in thickness was prepared by applying each aqueous cellulose nanofiber solution on one side of a polyethylene terephthalate film (thickness 20 μm), and tested for oxygen barrier properties using OXTRAN 10/50A from MOCON according to the determination method shown in JIS K 7126 B. Transparency was visually evaluated and rated as follows: ○ good, Δ fair, X poor.

The results are shown in Tables 1 and 2.

TABLE 1

|  | Brookfield viscosity (mPa · s) | Transparency | Oxygen barrier properties ($cm^3/m^2 \cdot day \cdot atm$) |
| --- | --- | --- | --- |
| Example 1 | 950 | ○ | 2.35 |
| Example 2 | 930 | ○ | 2.44 |
| Example 3 | 980 | ○ | 2.46 |
| Example 4 | 900 | ○ | 2.87 |
| Example 5 | 1050 | Δ | 3.08 |
| Example 6 | 1020 | Δ | 3.22 |

The cellulose oxidation reactions catalyzed by the 4-hydroxy TEMPO derivatives of Examples 1-4 gave high-quality nanofibers exhibiting excellent transparency and oxygen barrier properties.

TABLE 2

|  | Reaction period (min) | Consistency (%) | Brookfield viscosity (mPa · s) | Transparency | Oxygen barrier properties ($cm^3/m^2 \cdot day \cdot atm$) |
| --- | --- | --- | --- | --- | --- |
| Example 7 | 20 | 0.3 | 1020 | ○ | 1.55 |
| Example 8 | 20 | 0.9 | 580 | ○ | 0.95 |
| Comparative Example 5 | 120 | 0.3 | 650 | ○ | 3.88 |
| Comparative Example 6 | 120 | 0.9 | 320 | Δ | 6.23 |

In the cellulose oxidation reaction catalyzed by the radical 1-methyl-2-aza-adamantan-N-oxyl of Example 7, wood cellulose can be converted into cellulose nanofibers more rapidly than using TEMPO. Example 8 shows that a homogeneous and clear aqueous cellulose nanofiber solution can also be rapidly obtained from even microcrystalline cellulose powder partially containing aggregative cellulose nanofibers in the TEMPO oxidation reaction. The aqueous cellulose nanofiber solution oxidized with the radical 1-methyl-2-aza-adamantan-N-oxyl has high viscosity, thereby giving high-quality nanofibers less liable to be bent and having better oxygen barrier properties than those obtained by the TEMPO oxidation.

The invention claimed is:

1. A process for producing cellulose nanofibers comprising treating a cellulosic material with an oxidizing agent in water in the presence of an N-oxyl compound represented by formula 1 below:

[Formula 1]

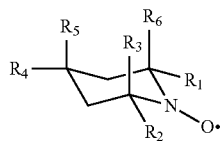

wherein $R_1$ and $R_2$ are each independently hydrogen or a $C_1$-$C_6$ straight or branched alkyl group; and
(i) one of $R_4$ or $R_5$ is —OR, —OCOR or —OSO$_2$R wherein R is a straight or branched carbon chain having 4 or less carbon atoms, and the other of $R_4$ or $R_5$ is hydrogen, and $R_3$ and $R_6$ are methyl, or
(ii) $R_4$ is hydrogen, and $R_5$, $R_3$ and $R_6$ are taken together with a piperidine ring to form an aza-adamantane compound having formula 2 below:

[Formula 2]

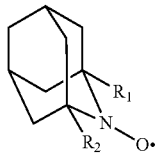

or a mixture thereof, and a compound selected from the group consisting of bromides, iodides and mixtures thereof to prepare oxidized cellulose, and microfibrillating the oxidized cellulose to convert it into nanofibers.

2. The process for producing cellulose nanofibers of claim 1 characterized in that the cellulosic material is bleached kraft pulp or bleached sulfite pulp.

3. A process for producing cellulose nanofibers comprising treating a cellulosic material with an oxidizing agent in water in the presence of an N-oxyl compound represented by any one of formulae 5-7 below:

[Formula 5]

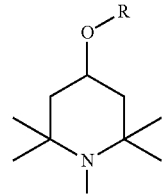

[Formula 6]

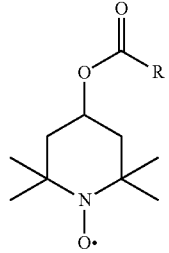

[Formula 7]

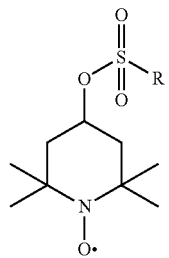

wherein R is a straight or branched carbon chain having 4 or less carbon atoms, and a compound selected from the group consisting of bromides, iodides and mixtures thereof to prepare oxidized cellulose, and microfibrillating the oxidized cellulose to convert it into nanofibers.

* * * * *